(12) United States Patent
Abe et al.

(10) Patent No.: US 7,212,371 B2
(45) Date of Patent: May 1, 2007

(54) STORAGE DEVICE AND ITS CONTROL METHOD AND MANUFACTURING METHOD

(75) Inventors: Yukio Abe, Kawasaki (JP); Shunji Saitou, Kawasaki (JP); Yoshifumi Obara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/052,185

(22) Filed: Feb. 7, 2005

(65) Prior Publication Data

US 2006/0082919 A1 Apr. 20, 2006

(30) Foreign Application Priority Data

Oct. 15, 2004 (JP) ............................ 2004-301353

(51) Int. Cl.
*G11B 5/596* (2006.01)
(52) U.S. Cl. ................................. 360/77.02
(58) Field of Classification Search ............... None
See application file for complete search history.

(56) References Cited

U.S. PATENT DOCUMENTS 6,108,157 A * 8/2000 Yoneda et al. ............. 360/75

6,924,956 B2 * 8/2005 Kurihara .................... 360/75

FOREIGN PATENT DOCUMENTS

| JP | 8-063920 | 3/1996 |
|----|----------|--------|
| JP | 11-016136 | 1/1999 |
| JP | 2001-155455 | 6/2001 |

\* cited by examiner

*Primary Examiner*—Hoa Thi Nguyen
*Assistant Examiner*—Mitchell Slavitt
(74) *Attorney, Agent, or Firm*—Greer, Burns & Crain, Ltd.

(57) ABSTRACT

A storage device, which comprises a storage media, a spindle motor which spins the storage media, a head unit which records and reads the data to the storage media, an actuator which carries out the positioning operation to the head unit on the storage media, a loading and unloading system which controls the actuator and carries out the unload operation that withdraws the head unit from the storage media and the loading operation that shifts the head unit onto the storage media, and a measurement means which measures the unloading energy required for the unload operation.

15 Claims, 9 Drawing Sheets

FIG. 9 ably known that a magnetic disk device  comprises a load and unload system that withdraws the magnetic head when device operation stops, so that the magnetic head floating over the magnetic disk does not touch the magnetic disk, and moves the magnetic head back onto the magnetic disk from the position where the head was withdrawn when device operation is restarted.

STORAGE DEVICE AND ITS CONTROL METHOD AND MANUFACTURING METHOD

BACKGROUND OF THE INVENTION

1. Field of the Invention

The present invention relates to a storage device, and technology relating to its control and manufacture, and more particularly, to an effective technology utilized in the storage unit, such as a magnetic disk device that utilizes magnetic disks as storage media.

2. Description of the Related Art

Similarly to examples described in patent literature 1, 2, and 3, it is widely known that a magnetic disk device comprises a load and unload system that withdraws the magnetic head when device operation stops, so that the magnetic head floating over the magnetic disk does not touch the magnetic disk, and moves the magnetic head back onto the magnetic disk from the position where the head was withdrawn when device operation is restarted.

Specifically, a sloped unit called a ramp is located adjacent to the periphery of the magnetic disk, and when rotation of the magnetic disk is ceased, the magnetic head is withdrawn onto the ramp on the unload operation initiated. When the magnetic disk is rotated and after the spinning speed of the magnetic disk has reached a certain speed, the magnetic head sitting on the ramp is moved to the magnetic disk, that is, the load operation is carried out.

This system securely prevents contact between the magnetic head and the magnetic disk when the operation of the magnetic disk ceases, and consequently prevents problems such as starting errors and damage to the magnetic disk surface where the data is stored, which are both caused by the adhesion of the magnetic head to the surface of the magnetic disk.

Further, this load and unload system can be used to resist shock, and is used for magnetic disk devices in laptop computers, which are required to be highly shock-resistant.

When this load and unload operation system is adopted, even in the event of sudden power failure, the unload operation ( emergency unload operation) can still be completed without the power supply by inputting the spindle motor back electromotive force, obtained from the spindle motor connected to the magnetic disk spinning under its own inertia, to the load and unload operation system, which consists of the voice coil motor.

However, the energy, required to overcome the friction with the ramp and to operate the unloading (hereafter called unloading energy), tends to increase in proportion to the number of unload operations. This characteristic of the unloading energy causes a technical issue, when the unloading energy becomes greater than the spindle motor back electromotive force, the emergency unload cannot be performed in power failure, and a starting error occurs when the device is restarted because the magnetic head and the magnetic disk are left in contact.

That is, in restarting the magnetic disk spin by the spindle motor, a starting error occurs because of the friction and adhesion between the magnetic head and the magnetic disk, leading to the serious error that the data cannot be read from the magnetic disk device.

The patent literature 1 discloses technology that controls the loading and unloading using a voice coil motor by detecting the speed from the voice coil motor back electromotive force that drives the head. However, the above-explained technical issue caused by the change in the unloading energy is not mentioned.

Also the patent literature 2 discloses a technology based on the control of the speed of the load/unload preventing the collision between the head and the disk during loading by the feedback of the voice coil motor back electromotive force to the driving circuit of the voice coil motor. However, the technical issue caused by the change in the unloading energy is again not recognized.

Moreover, during the regular unload operation, when the unloading fails without confirming whether the head is parked or not, the spin of the disk ceases with the head remaining on the magnetic disk. Therefore the technical issue still remains unsolved, and upon restarting the device a starting error occurs for the same reason as explained above.

For this reason, patent literature 3 discloses technology that prevents unloading failures by detecting the moving speed of the head slider during unloading, and by determining whether the head slider reached a predetermined unloading position or not based on the detected moving speed. However, because detection of the unloading completion is based on the moving speed of the head slider and it is an indirect approach, there remains concern about the low accuracy of the method.

Patent literature 1: Japanese Publication Unexamined Application No. 2001-155455

Patent literature 2: Japanese Publication Unexamined Application No. Heisei 8-63920

Patent literature 3: Japanese Publication Unexamined Application No. Heisei 11-16136

SUMMARY OF THE INVENTION

It is an object of the present invention to securely prevent unloading failure in storage units that load and unload the head which read from and write to the storage media.

It is another object of the present invention to eliminate potentially defective products during the process of manufacturing the storage units that load and unload the head which read from and write to the storage media.

It is the first aspect of the present invention to provide the storage device, which comprises:

storage media;

a spindle motor, which spins the storage media;

a head unit, which records data to and reads data from the storage media;

an actuator, which carries out the positioning operation of the head unit on the storage media;

a loading and unloading system, which control the actuator, and carries out the unload operation that withdraws the head unit from the storage media and the loading operation that shifts the head unit over the storage media; and a measurement means, which measures the unloading energy required for the unload operation.

It is the second aspect of the present invention to provide a storage device, which comprises:

storage media;

a spindle motor, which spins the storage media;

a head unit, which records data to and reads data from the storage media;

an actuator, which reads out the positioning control data stored in the storage media, and carries out the positioning operation on the head unit;

a loading and unloading system, which controls the actuator, and carries out the unload operation that withdraws the head unit from the storage media and the loading operation that shifts the head unit over the storage media; and an unloading verification means, which determines whether the unload operation succeeded or not based on the read status of the positioning control data from the storage media.

It is the third aspect of the present invention to provide a control method of the storage device, which comprises:

a storage media;

a spindle motor, which spins the storage media;

a head unit, which records data to and reads data from the storage media;

an actuator, which carries out the positioning operation of the head unit on the storage media; and a loading and unloading system, which controls the actuator, and carries out the unload operation that withdraws the head unit from the storage media and the loading operation that shifts the head unit over the storage media, and the control method of the storage device, which includes;

a first process where the unloading energy required for the unload operation is measured during the unload operation; and a second process where warning of a future failure of the unload operation is issued based on a difference in the unloading energy value from the criteria value.

It is the fourth aspect of the present invention to provide a control method of the storage device, which includes:

a process to control the unloading that carries out the withdrawal of the head unit, which records and plays data on the spinning storage media, from the storage media;

a process to read a specific data stored on the storage media after the unload operation; and a process to determine whether the unloading succeeded or not based on the read of the specific data.

It is the fifth aspect of the present invention to provide a manufacturing method of the storage device, which comprises a load and unload system, which carries out the unload operation that withdraws the head unit, which records and reads the data to the storage media, from the storage media and the load operation that moves the head unit over the storage media, and the manufacturing method measures the unloading energy required for the unload operation to determine the quality of the storage device based on the difference in the unloading energy value from the nominal value after the completion of the assembling of the storage device.

According to the first and the third aspects of the present invention, the unloading energy required for the unload operation is measured and compared with the voice coil motor back electromotive force, for example, obtained from the inertia of the magnetic disk during power failure. When the unloading energy exceeds the voice coil motor back electromotive force, the unload operation failure can be securely prevented by outputting a warning to notify of the failure of the next emergency unload during power failure.

Also, according to the second and the fourth aspects of the present invention, specific data on the storage device is read by the head after the unload operation, and the completion of the unloading can be directly and securely recognized by confirming the read failure. Thus, the unload operation failure can be securely prevented.

Furthermore, according to the fifth aspect of the present invention, whether the emergency unload is apt to fail or not can be predicted in the storage device by measuring the unloading energy after the completion of assembly and before shipment. The quality of the storage device can be accurately distinguished by the loading and unloading performance, and therefore, potentially defective products can be eliminated.

DESCRIPTION OF THE PREFERRED EMBODIMENT

A detailed explanation of the preferred embodiment of the present invention referring to the drawings is given below. For the explanation of the present embodiments, a magnetic disk device (a hard disk device: HDD) is selected as an example of a storage unit.

Figure 1:
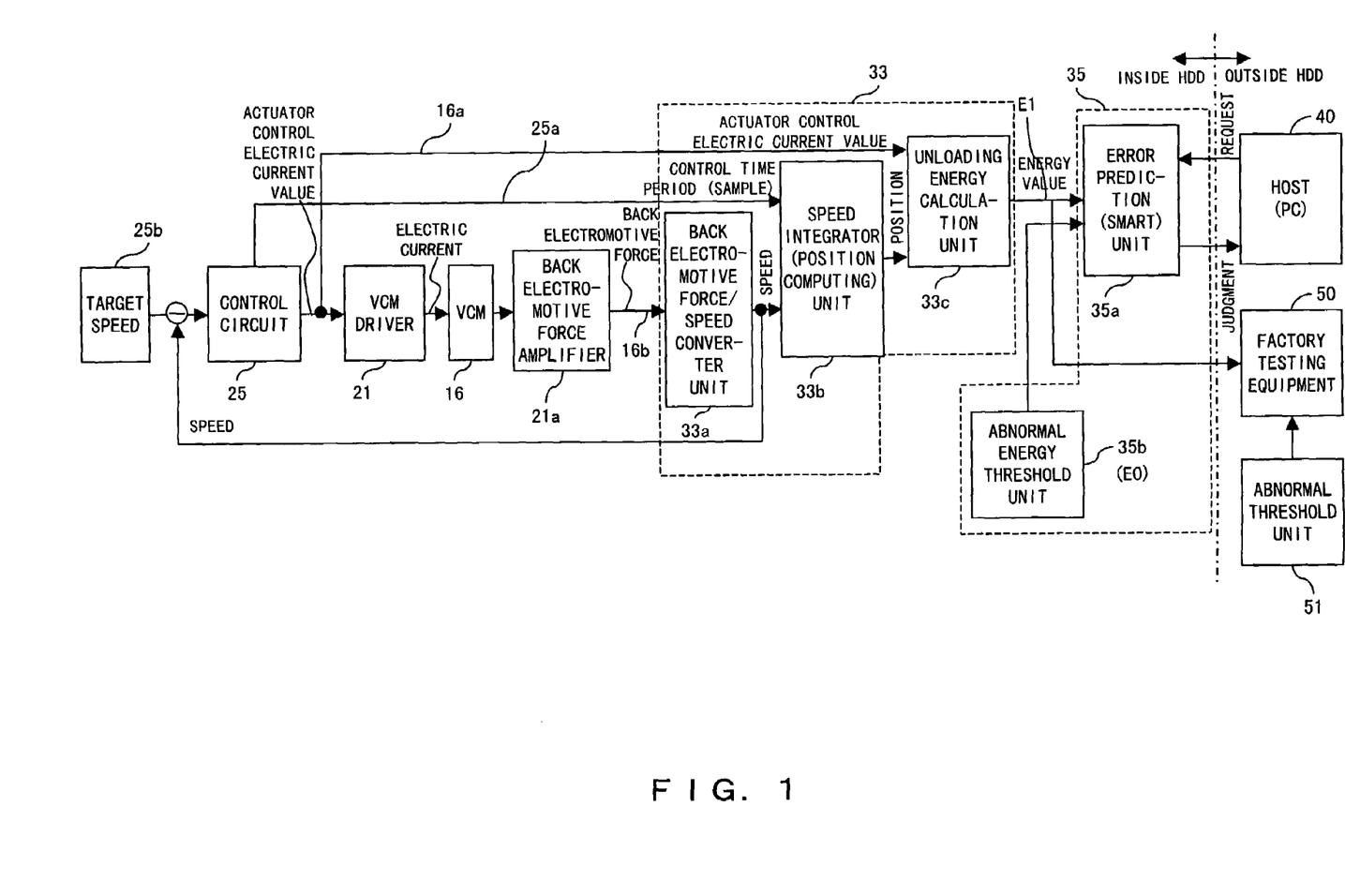
FIG. 1 is a block diagram showing the configuration and the operation of the unload control unit in the preferred embodiment of the present invention.
Figure 2:
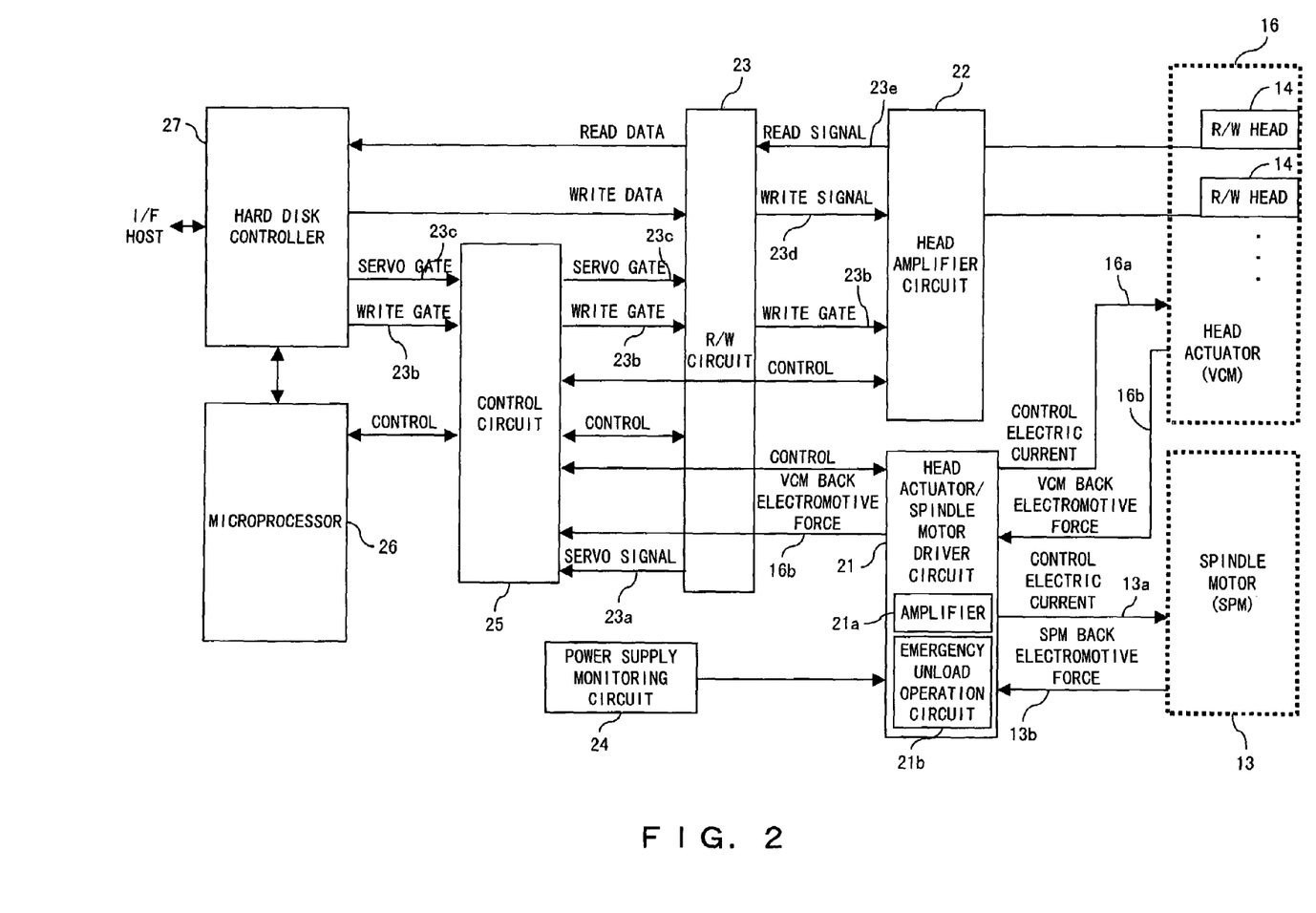
FIG. 2 is a block diagram of the configuration of the control system in the magnetic disk device of the present embodiments.
Figure 3:
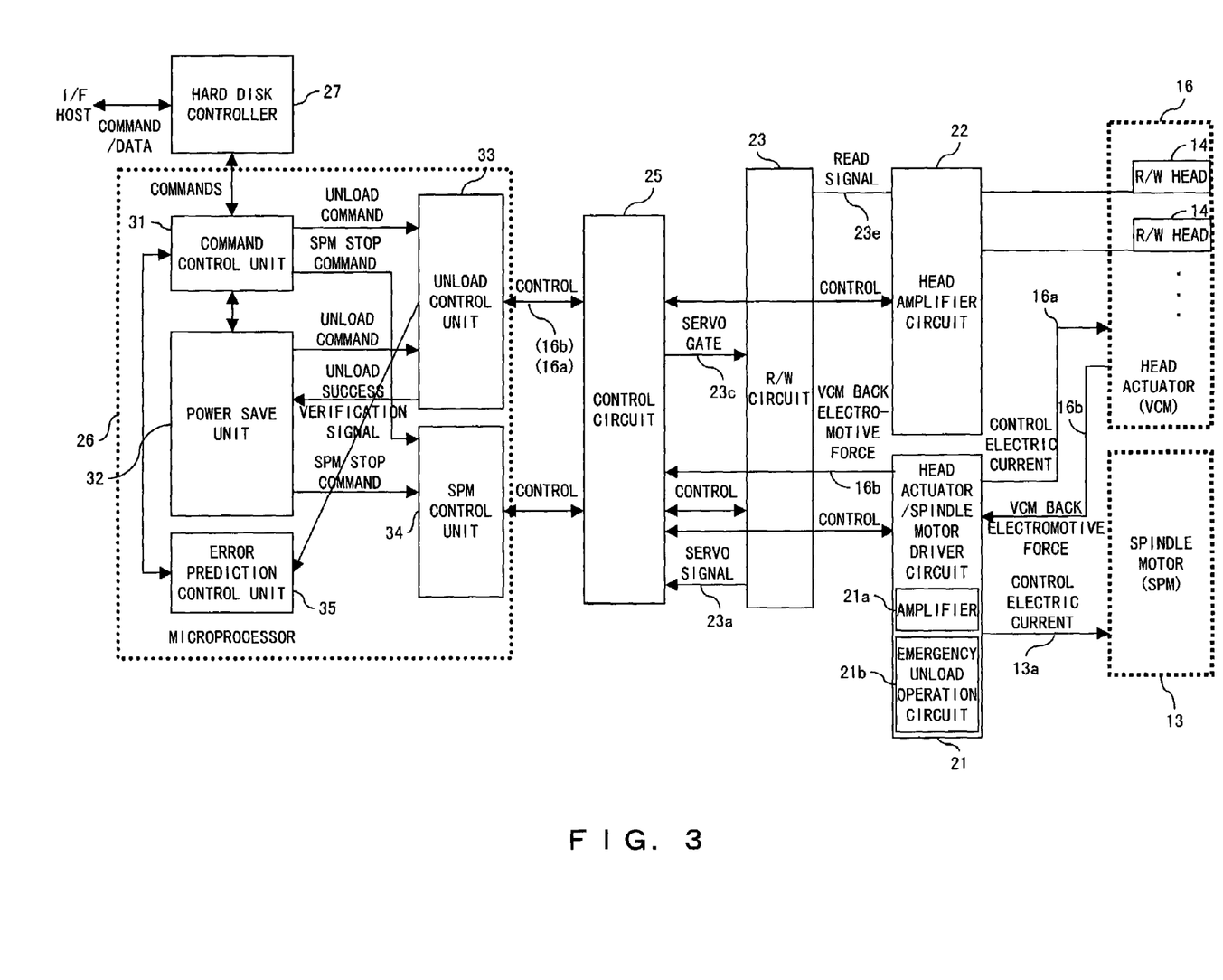
FIG. 3 is a detailed block diagram of the configuration of the control system in the magnetic disk device of the present embodiments.
Figure 4:
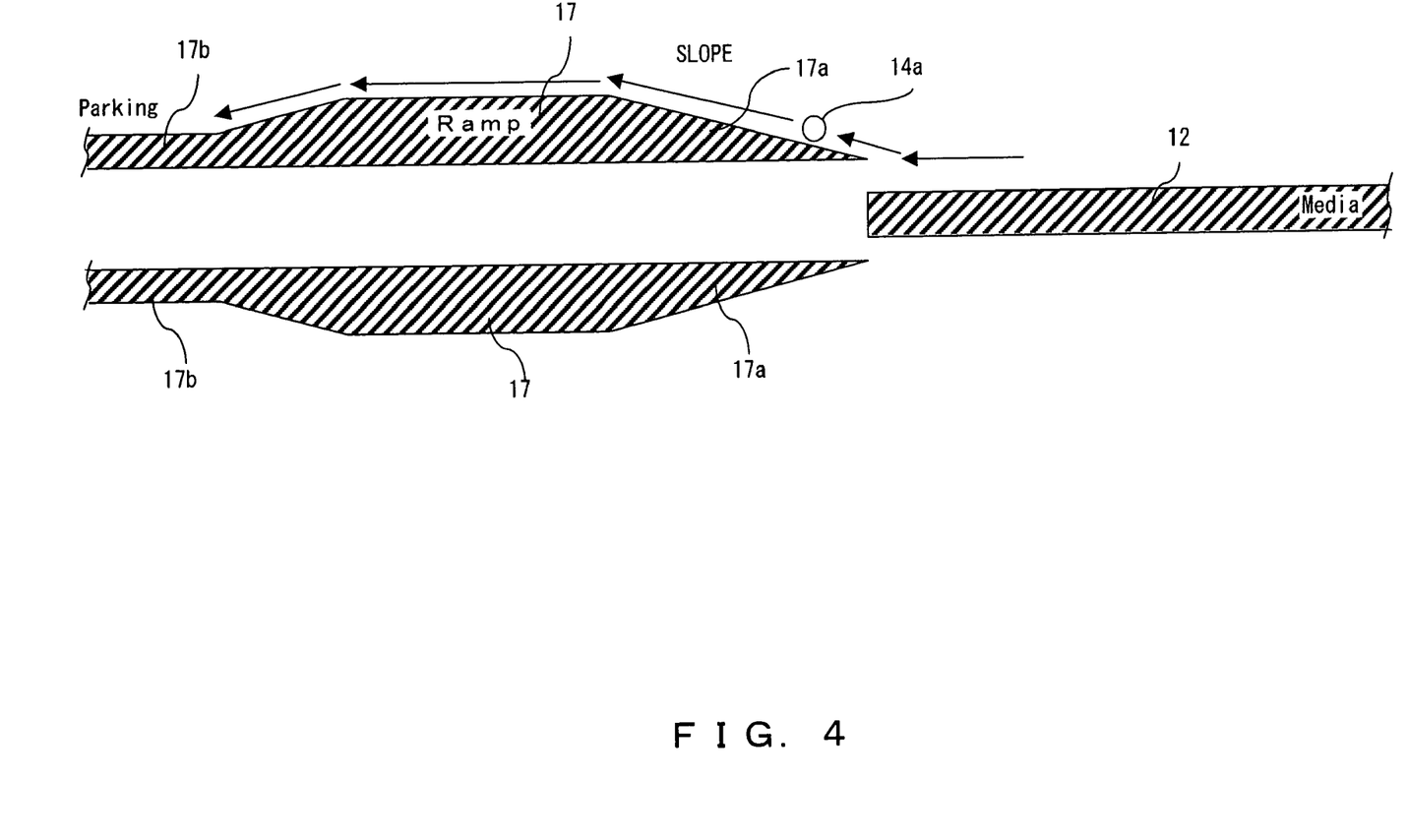
FIG. 4 is cross-sectional drawing of the unload operation in the magnetic disk device of the present embodiments.
Figure 5:
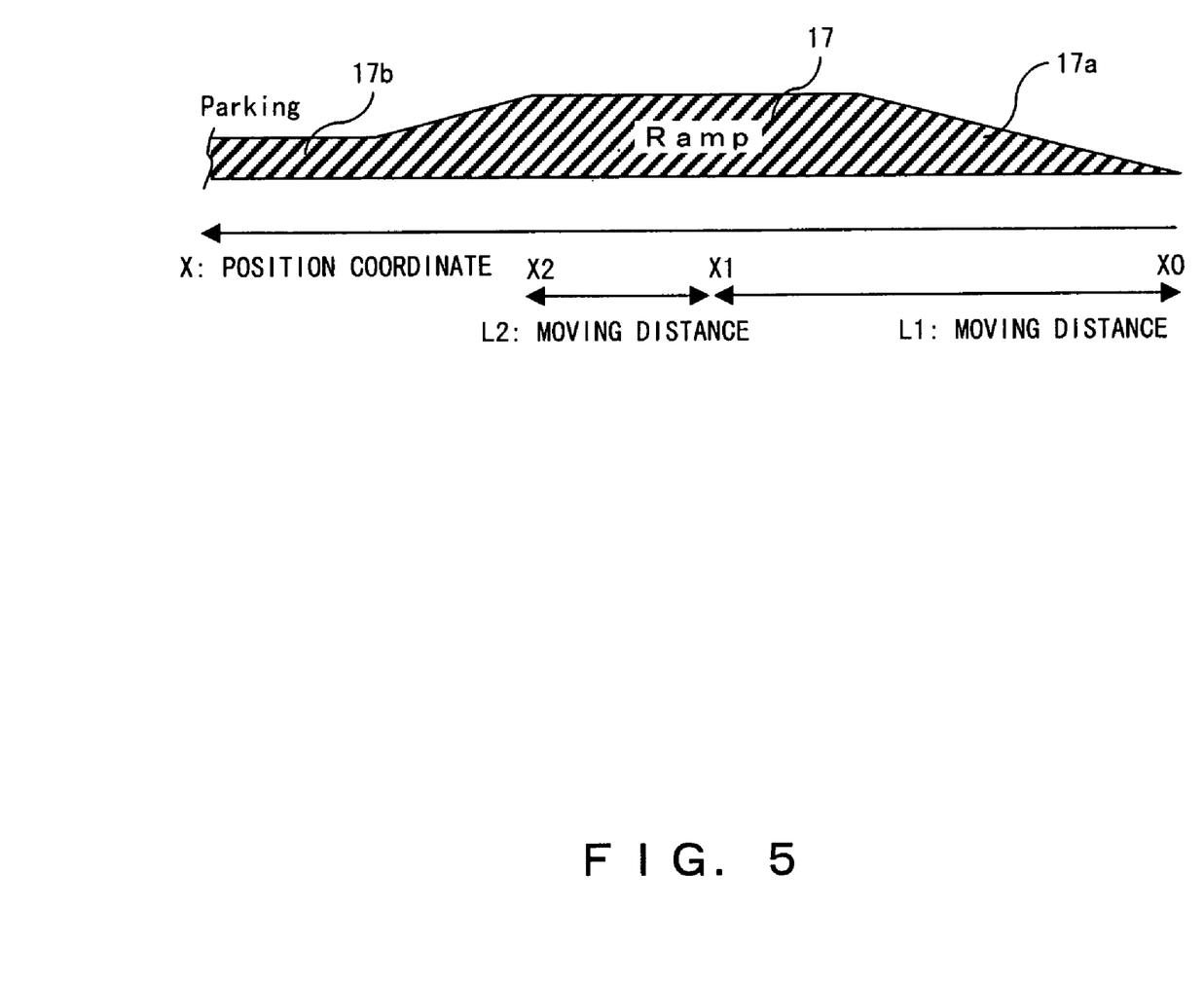
FIG. 5 is a detailed cross-sectional drawing of the unload ramp in the magnetic disk device of the present embodiments.
Figure 6:
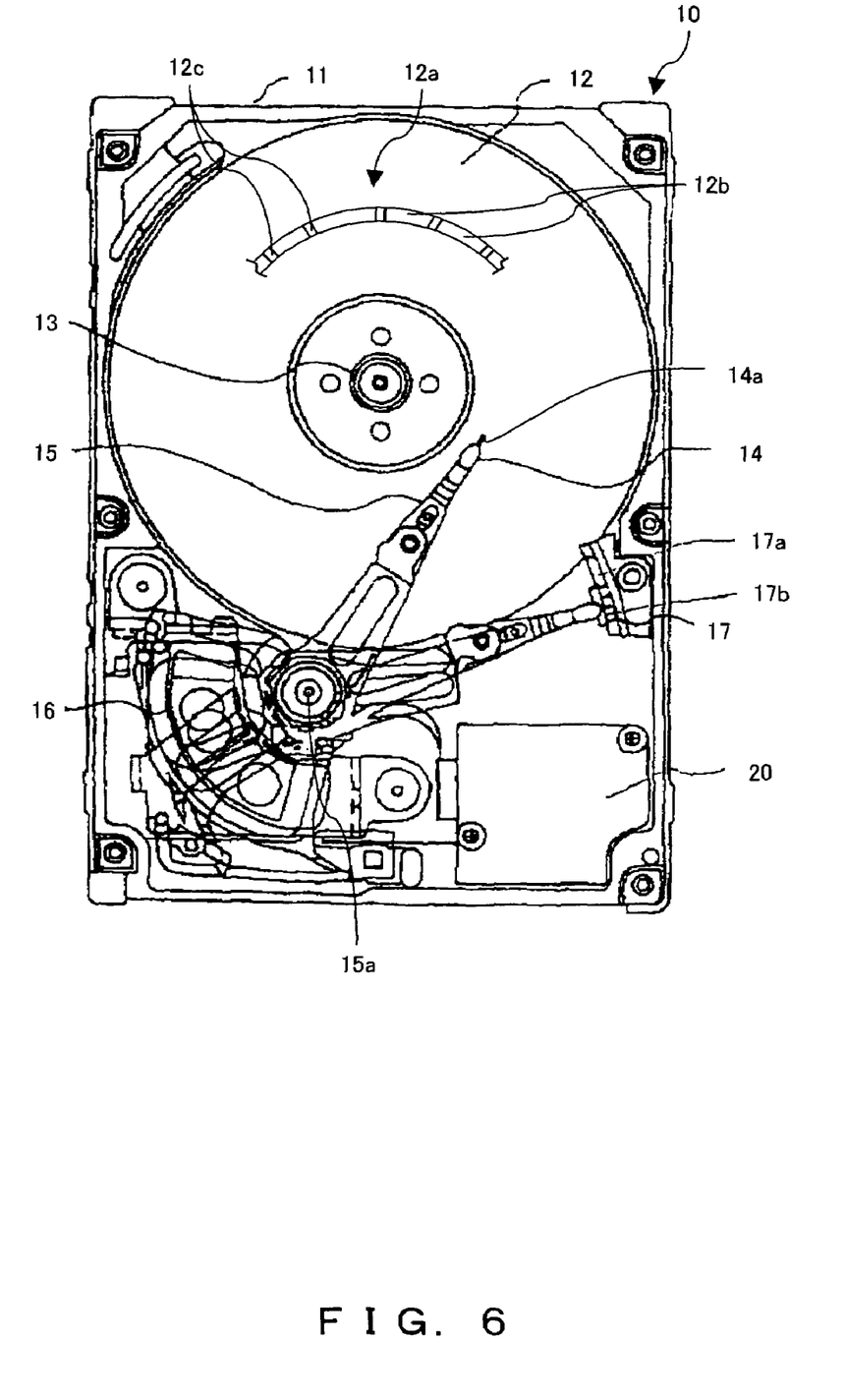
FIG. 6 is a plan view drawing showing the configuration of the magnetic disk device of the present embodiments.
Figure 7:
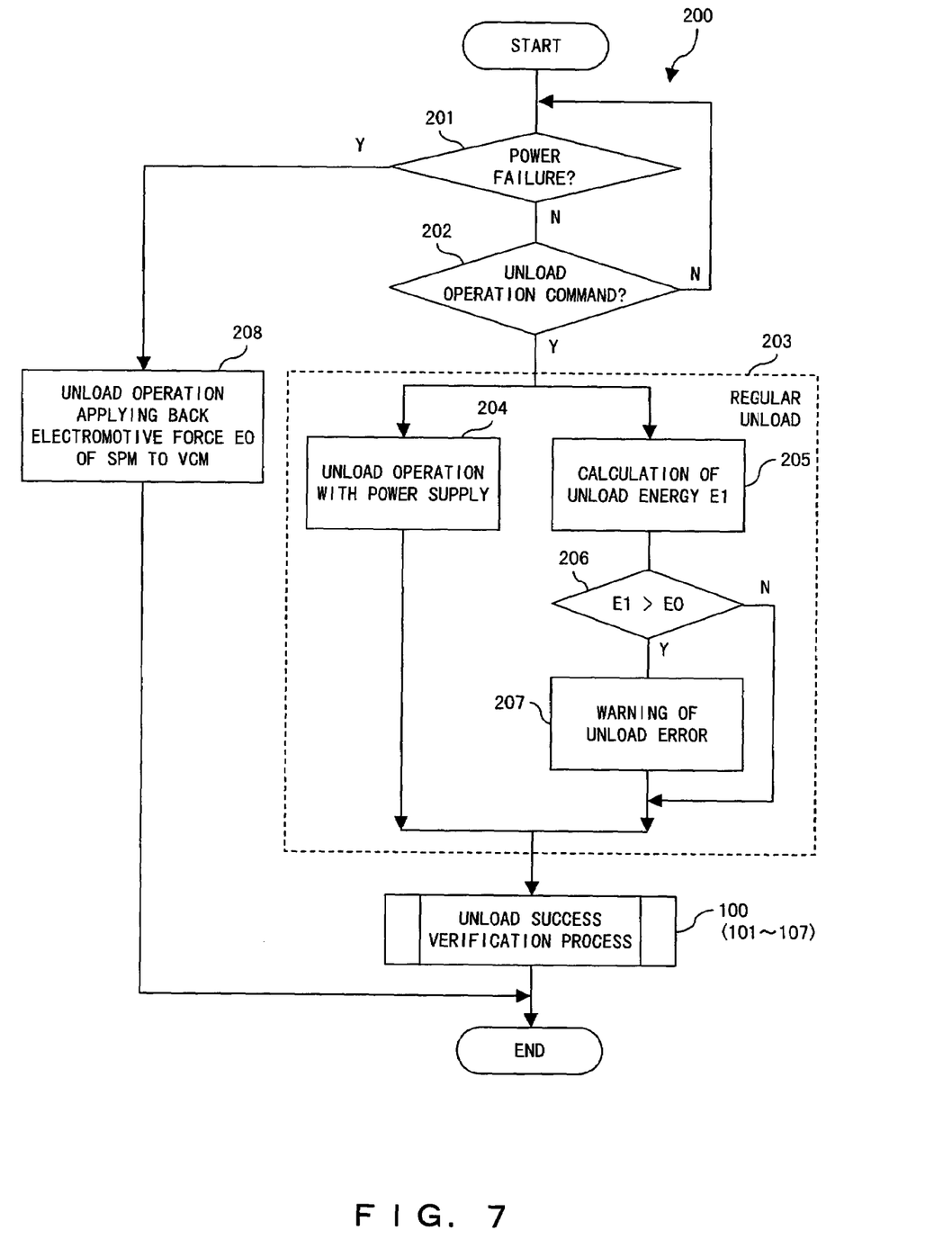
FIG. 7 is a flowchart indicating the operation of the magnetic disk device of the present embodiments.
Figure 8:
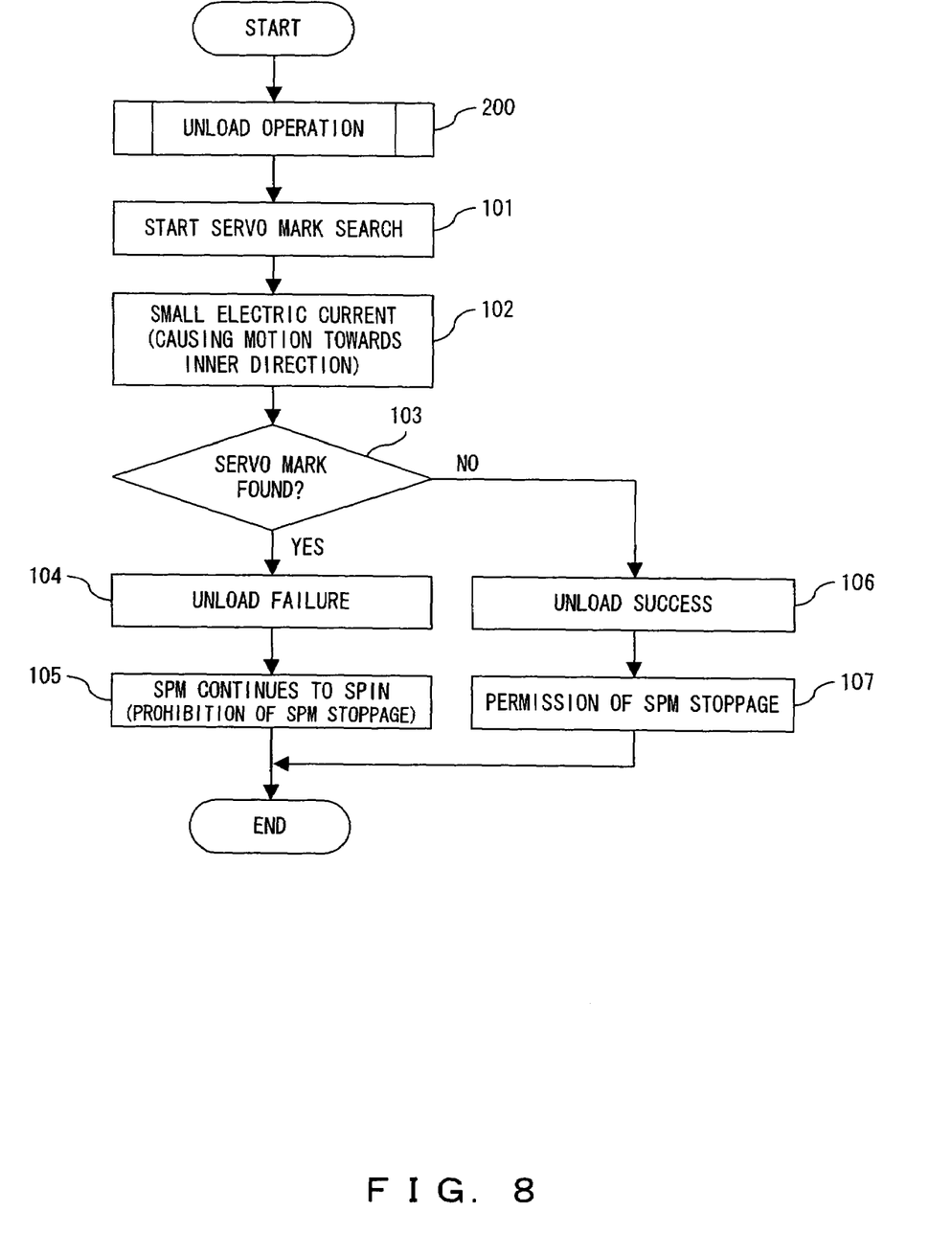
FIG. 8 is a flowchart indicating the operation of the magnetic disk device of the present embodiments.
Figure 9:
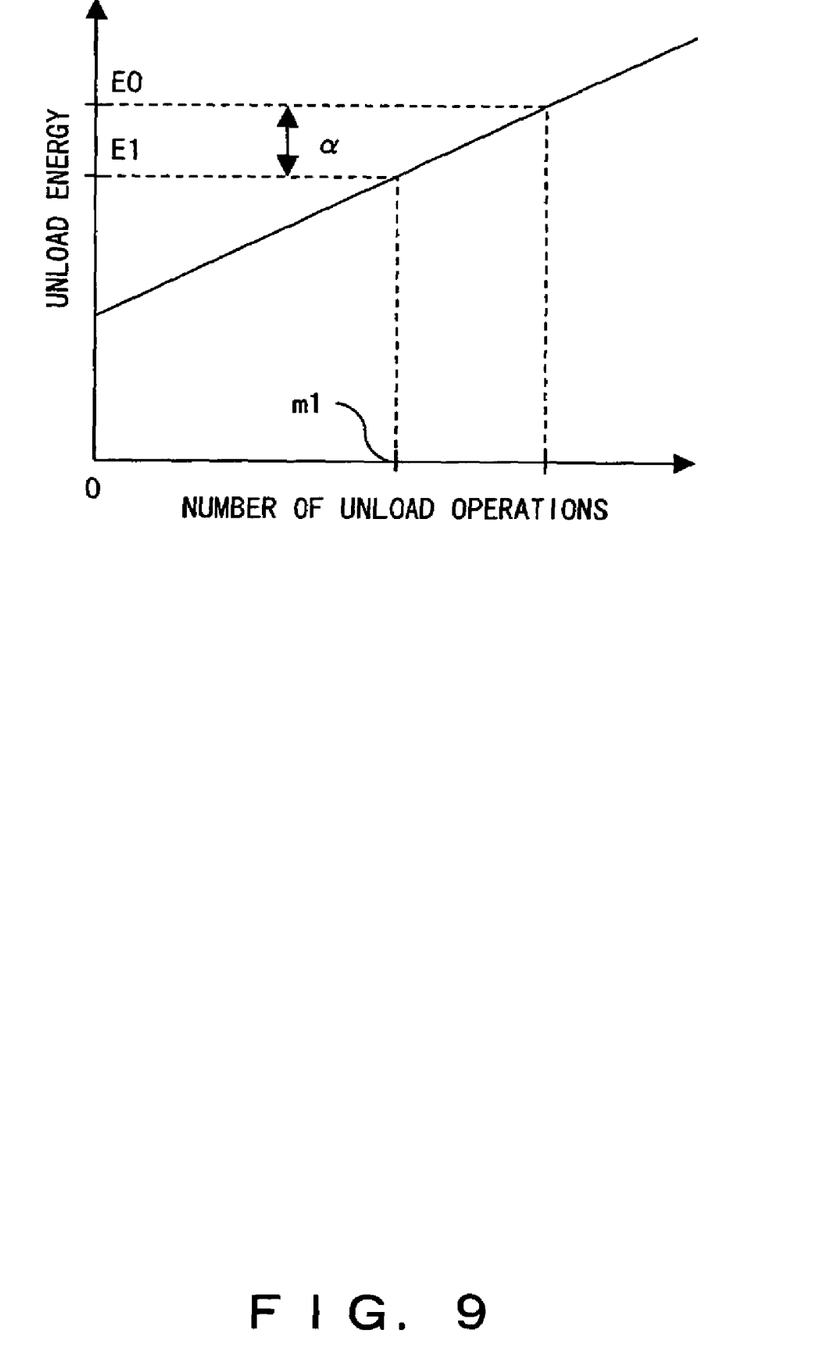
FIG. 9 is a graph showing the change in unloading energy of the magnetic disk device of the present embodiments.

FIG. 1 is a block diagram describing the configuration and the operation of the unload control unit in the preferred embodiment of the present invention. FIG. 2 is a block diagram of the configuration of the control system in the magnetic disk device of the present embodiments. FIG. 3 is a detailed block diagram of the configuration of the control system in the magnetic disk device of the present embodiments. FIG. 4 and FIG. 5 are cross-sectional drawings of the unload operation of the magnetic disk device of the present embodiments. FIG. 6 is a plan view drawing showing the configuration of the magnetic disk device of the present embodiments. FIG. 7 and FIG. 8 are flowcharts indicating the operation of the magnetic disk device of the present embodiments. FIG. 9 is a graph showing the change in unloading energy of the magnetic disk device of the present embodiments.

As described in FIG. 6, the magnetic disk device 10 of the present embodiments comprises the spinning magnetic disk 12 supported by the spindle motor 13 that is fixed to the body 11, the head unit 14 that carries out the record and read operations on the data on the magnetic disk 12, and a head arm 15 that supports the head unit 14 at the distal part. The tip of the head unit 14 is mounted to the load bar 14a for loading and unloading as explained later.

The proximal part of the head arm 15 is fixed on the voice coil motor 16 that pivots on the pivot 15a fixed to the outside body 11. The loading point of the head unit 14 along the diameter of the magnetic disk 12 is determined by this pivoting movement of the head arm 15, by the voice coil motor 16, which is along the plane surface of the magnetic disk 12. That is, on the magnetic disk 12, there is a plurality of tracks 12*a* in concentric circles. Each track 12*a* has data sectors 12*b* and servo marks 12*c* arranged alternately along its circumference.

The combination of the displacement data of the head unit 14 along the diameter, which is controlled by reading the servo data from servo marks 12*c* and the spin of the magnetic disk 12 allows a positioning process that can place the head unit 14 on any data sector 12*b* on any track 12*a*.

Adjacent to the periphery of the magnetic disk 12 and within the pivoting range of head arm 15 is the ramp 17 that is fixed to the outside body 11. The pivoting range of the head arm 15 driven by the voice coil motor 16 is configured so that the range covers from the whole radius of the magnetic disk 12 to the position of the ramp 17, which is placed on the outside of the magnetic disk 12.

The periphery of the magnetic disk 12, which is closer to the ramp 17 does not record data and remains unused for moving the head arm 15 from the ramp 17 to the magnetic disk 12. The inside track of this unused domain is the data zone used for data recording.

The ramp 17 comprises a slope 17*a* and parking 17*b* that is a dent made outside of the slope 17*a*.

As it is described in FIG. 4, the unload operation proceeds in such way that the head unit 14 is moved away from the magnetic disk 12 by pivoting the head arm 15 toward the periphery of the magnetic disk 12 and letting the load bar 14*a* run onto the slope 17*a* and stops at the position of the parking 17*b*. Conversely, the load operation proceeds in such way that the head unit 14 is moved smoothly on to the magnetic disk 12 by moving the load bar 14*a* along the slope 17*a* from the position of parking 17*b*.

Stored inside the body 11 is the control board 20 which includes head amplifier etc. FIG. 6 shows the plan view without the cover of the body 11 (not shown in the drawing). The body 11 is enclosed by the cover.

With reference to FIG. 2, an example configuration is given below to explain the control system of the present embodiment, which is installed on the main control board attached outside of the body 11 (not shown in the drawing).

For the present embodiment, the control board comprises a driver circuit 21, a head amplifier circuit 22, a read/write circuit 23, a power supply monitoring circuit 24, a control circuit 25, a microprocessor 26, and a hard disk controller 27.

The driver circuit 21 controls the spin of the spindle motor 13 maintaining a designated speed and the spin-down process by varying the electric current 13*a* applied to the spindle motor 13.

Also the driver circuit 21 applies the actuator control electric current 16*a* to the voice coil motor 16 and controls the direction, position and the pivot speed of the head arm 15 driven by the voice coil motor 16.

The driver circuit 21 is equipped with an emergency unload operation circuit 21*b*. When power failure, detected by the power supply monitoring circuit 24, occurs, the back electromotive force 13*b* (the energy E0), generated by the spindle motor 13 and the magnetic disk 12 spinning under its inertia, is applied to the voice coil motor 16 as the actuator control electric current 16*a*. The unloading of the head unit 14 (such unloading operated by the emergency unload operation circuit 21*b* independently of the power supply in the state of power failure in the magnetic disk device 10 is hereafter called emergency unload) can be performed independently of the power supply, which can be compared to hardware that is operated independently of the other units (i.e. the back electromotive force).

The driver circuit 21 is comprised in part of a back electromotive force amplifier 21*a* amplifies the voice coil motor back electromotive force 16*b*, generated depending on the pivot displacement of the voice coil motor 16, and sends it out to the control circuit 25.

The head amplifier circuit 22 amplifies the write signal 23*d* received from the read/write circuit 23, and outputs the signal to the head unit 14. Moreover, the head amplifier circuit 22 amplifies the signal read from the magnetic disk 12 by the head unit 14 and outputs the signal as the read signal 23*e* to the read/write circuit 23.

The read/write circuit 23 converts the read signal 23*e* from the head amplifier circuit 22 into read data and outputs the data to the hard disk controller 27. The read/write circuit 23 also converts the write data input from the hard disk controller 27 into the write signal 23*d* and outputs the signal to the head amplifier circuit 22.

The power supply monitoring circuit 24, as explained above, detects cutoff of the power supply in the magnetic disk device 10, and outputs a detection signal to the driver circuit 21 in order to execute an emergency unload.

The control circuit 25 controls the operation of the driver circuit 21, the head amplifier circuit 22 and the read/write circuit 23 by the output of a "control signal".

The control circuit 25 also controls the output timing of the write signal 23*d* from the head amplifier circuit 22 to the head unit 14 by inputting the output of the write gate 23*b* to the head amplifier circuit 22 through the read/write circuit 23.

In addition, the control circuit 25 controls the timing of extraction of the servo signal 23*a* in the hard disk controller 27 and the read/write circuit 23 from the read signal 23*e* input to the read/write circuit 23 by the head amplifier circuit 22 by providing the servo gate 23*c* to the hard disk controller 27 in the higher level and the read/write circuit 23 in the lower level.

In the present embodiment, the unload operation (i.e. non-emergency unload), is under the control of the control circuit 25 that controls the voice coil motor 16 through the driver circuit 21, as described in FIG. 1. During this unload operation, the control circuit 25 inputs the value of the actuator control current 16*a* and that of the voice coil motor back electromotive force 16*b* as control signal to the microprocessor 26 that is at a higher level.

The hard disk controller 27 controls the transfer of the data with the host computer 40 through a certain interface standard.

The microprocessor 26, as it is described in FIG. 3, houses the command control unit 31, power save control unit 32, unload control unit 33, spindle motor control unit 34, and error prediction control unit 35.

To be more specific, the command control unit 31 analyzes the command issued by the external host computer 40 through the hard disk controller 27.

When there is no exchange of commands with the external host through the hard disk controller 27 for a certain period of time, the power save control unit 32 shifts the status of the magnetic disk device 10 to power saving mode.

The unload control unit 33 controls the unload operation (except for emergency unload), through the control circuit 25, and also measures the unloading energy E1 with the functional structure described in FIG. 1 during the unload operation.

That is, the unload control unit 33 comprises the following units:

a back electromotive force/speed converter unit 33a that detects the speed of the head unit 14 from the voice coil motor back electromotive force 16b, input through the control circuit 25;

a position computing unit 33b that calculates the position of the head unit 14 by integrating the values of the output speed from the back electromotive force/speed converter unit 33a based on the sampling interval 25a at the unload control unit 33; and an unloading energy calculation unit 33c that calculates the energy required for unloading (unloading energy E1) of the head unit 14 from the change in the positional data output from the position computing unit 33b and the value of the actuator control electric current 16a at the time of unloading.

The error prediction control unit 35 comprises an error prediction unit 35a and an abnormal energy threshold unit 35b. The error prediction unit 35a predicts the unload error implied by the increase in the unloading energy, based on the comparison between the unloading energy E1 from the unloading energy calculation unit 33c and a predetermined threshold set at the abnormal energy threshold unit 35b.

That is, repetition of unloading causes roughening of the surface of the slope 17a of ramp 17 due to friction with the load bar 14a etcetera, and as a result, the increase in the unloading energy tends to be proportional to the number of repetitions (see FIG. 9).

However, because the magnetic disk 12 in operation is spinning at the designated rated speed, the spindle motor back electromotive force 13b (E0) obtained from the spindle motor 13 by the inertia of the spinning magnetic disk 12 is almost fixed.

Therefore, when the unloading energy E1 exceeds E0, the emergency unload cannot be completed with the supply of E0 to the voice coil motor 16.

For the present embodiment, the error prediction control unit 35 sets E0 to the abnormal energy threshold unit 35b and monitors the change in the unloading energy E1. When E1>E0, the error prediction control unit 35 sends out an unload error warning to the host computer 40, caused by the cancellation of the emergency unload operation. Also, as the need arises, based on the relationship between the unloading energy E1 and the number of unload operations shown in FIG. 9, the unloading energy E1 can be converted into the number of unload operations m1, and can be sent to the host computer 40 as analysis data instead of the actual number of unload operations.

Moreover, the error prediction control unit 35 consists of a self-monitoring sub-assembly as provided in standard commercial magnetic disk device 10 such as devices represented by S.M.A.R.T. (Self-Monitoring Analysis and Reporting Technology System). As such it can predict errors based on the change in the unloading energy E1, and provide error prediction data response as requested by the host computer 40.

An explanation of an example of operation of the present embodiment is given below.

As shown in FIG. 1, upon receiving the unload operation command, the control circuit 25 applies the actuator control current 16a to the voice coil motor 16 through the driver circuit 21. The voice coil motor back electromotive force 16b, output from the back electromotive force amplifier 21a, and the speed converted from the voice coil motor back electromotive force 16b at the back electromotive force/speed converter unit 33a form a closed-loop control the output of which corresponds to the target speed 25b.

Because the voice coil motor 16 is a motor that generates the pivoting displacement (torque) that drives the head unit 14 from the force generated by the flow of the electric current (actuator control current 16a) to the coil in a magnetic field, the moving speed of the voice coil motor 16 (the head unit 14) is proportional to the back electromotive force (the voice coil motor back electromotive force 16b), which is generated by the motion of the voice coil motor 16.

Accordingly, the voice coil motor back electromotive force 16b can be converted into the speed of the head unit 14 by the back electromotive force/speed converter unit 33a. The position computing unit 33b calculates the position value by integrating the speed signal value output by the back electromotive force/speed converter unit 33a every sampling time period 25a provided by the control circuit 25. In addition, the unloading energy calculation unit 33c calculates the energy required to unloading (the unloading energy E1) using the position signal output by the position computing unit 33b and the electric current value (the actuator control current 16a), required to pivot the voice coil motor 16 (the head unit 14) a certain distance.

To be more specific, the energy required to move the head unit 14 in unloading is expressed in the following equation (1).

$$E[kgf.mm] = ((Bl[N/A] \times i[A])/9.8) \times x[mm] \tag{1}$$

Here, Bl is a force constant [unit: Newton/ampere] that is unique to the voice coil motor 16, i is the actuator control current 16a [unit: ampere] and x is the displacement of the head unit 14 [unit: mm].

As it is described in FIG. 5, the moving distance of the head unit 14 is calculated by integrating the speed converted from the voice coil motor back electromotive force 16b that is generated from the voice coil motor 16.

As explained below, it is also acceptable to calculate the corresponding energy value by dividing the displacement of the head unit 14 at the ramp 17. That is, the position X0 is set as the unload starting point, and the corresponding energy value is calculated from the electric current required to move the head to the position X1 and from the moving distance L1 between X0 and X1. In the same manner, the energy corresponding value on the moving distance L2 from the position X2 to the position X1 is calculated. This is because the part of the slope 17a requires the largest moving energy under normal conditions.

The unloading energy calculation unit 33c calculates the required unloading energy by integrating the electric current value i (actuator control current 16a), required to move the head for a distance x, at every sampling time period 25a during the movement over a certain distance, as in the following equation (2).

$$y(n) = i(n-1) \times x + y(n-1) \tag{2}$$

The position computing unit 33b and the unloading energy calculation unit 33c can be operated simultaneously with the unload operation, therefore, the unloading energy E1 can be calculated for every unload operation.

The error prediction control unit 35 compares the unloading energy E1 calculated in the way described above with the threshold value (in this case, it is E0) that is set as the abnormal energy threshold unit 35b, and warns the host computer 40 when the unloading energy E1 exceeds the threshold value.

In the present embodiment, as an example of a warning system (including change in unloading energy E1 to the host computer 40), the S.M.A.R.T system (Self-Monitoring Analysis and Reporting Technology System), which is a function of ATA interface, is used. In this case, the unloading energy value E1 has to be added to the check items of S.M.A.R.T, or the unloading energy has to be converted to the number of load/unload operations that is an existing check item.

In other words, under normal conditions, repetition of the load and unload operation increase the unloading energy E1 required for unloading due to the surface roughening of the slope 17a, therefore, the existing S.M.A.R.T has been using the number of load/unload operations as the datum of the extent of increase in the unloading energy E1 for analysis.

It is also acceptable that, besides the S.M.A.R.T warning, the error prediction control unit 35 reports the error to the host computer 40 responding to its self-analysis test.

In addition, unloading energy E1 data output by the magnetic disk device 10 of the present embodiment can be used during the inspection of the manufacturing method and inspection of the magnetic disk device 10.

That is, as it is shown in FIG. 1, during the manufacturing method of the magnetic disk device 10, between the completion of assembly and shipment, by comparing the unload energy E1 output by the unload control unit 33 of the magnetic disk device 10 with the abnormal threshold 51 using the factory testing equipment 50, the quality of the magnetic disk device 10 can be determined.

Setting E0-α as the abnormal threshold 51 allows the determination of whether the measured value of the unloading energy E1 is enough to absorb the increase of the unloading energy corresponding to the number of load/unload operations operated during the estimated life of the device or not. α indicates the difference (the amount of extra energy) between E0 and the unloading energy E1 that corresponds to the estimated number of load/unload operations during the life of the device.

During inspection after completion of factory assembly the factory testing equipment 50 determines the device as a quality product if the unloading energy value is smaller than (E0-α), and as a defective product that cannot last for the estimated life of the device when the unloading energy value is greater than (E0-α).

With reference to FIG. 7, an explanation of the whole loading and unloading operation of the magnetic disk device 10 of the present embodiment on the basis of the above description is given below.

There are two kinds of unloading in the magnetic disk device 10: the regular unloading that is powered by the regular power supply; and the emergency unload that is operated when the power supply is cut off suddenly.

The regular unloading is initiated by the additional two triggers. One of the triggers is when the shifting command is received from the host computer 40 to shift to idle mode. In this case, the idle command is received from the hard disk controller 27, and the command control unit 31 sends the unload command to the unload control unit 33. The unloading control unit 33 controls the driver circuit 21 through the control circuit 25, sends the actuator control current 16a to the head actuator (the voice coil motor 16), moves the voice coil motor 16 in the direction of the ramp 17, and withdraws the head unit 14 onto the ramp 17. In this unloading control, as it is described in FIG. 1, by converting the voice coil motor back electromotive force 16b generated by the voice coil motor 16 into a speed, the feedback control is executed setting the speed as input and the control electric current as output.

Another trigger of the regular unloading is when the mode is shifted to the power save mode. The power save control unit 32 of the microprocessor 26 monitors the command operation status of the command control unit 31, and, when commands are not executed, initiates the power saving process in each of the units of the magnetic disk device 10 in order to decrease the power consumption. When no execution of commands continues for a certain time period, by unloading the head unit 14, the driving electric current of the voice coil motor 16 is set to zero, and therefore, the power save control unit 32 issues commands to the unload control unit 33 to unload the head. The unloading control in this case is the same as the shift command to the idle mode from the host computer 40.

On the other hand, the emergency unload is executed when the head is not unloaded and the power supply is shut down. That is, when the power supply is cut off and the head is still loaded, the emergency unload is executed for the purpose of unloading the head unit 14 before the spindle motor 13 stops to prevent the head unit 14 from touching the magnetic disk 12.

When the driver circuit detects the power supply cutoff of the magnetic disk device 10 by the data from the power supply monitoring circuit 24, the emergency unload operation circuit 21b drives the head to the unloading direction without the power supply from outside by inputting the back electromotive force 13b output from the spindle motor 13 spinning with the magnetic disk 12 under its own inertia to the voice coil motor 16.

The unloading energy E1 is calculated by the unload control unit 33 of the microprocessor 26. The unloading energy E1 is calculated simultaneously with the regular unloading explained above.

The unloading energy E1 is monitored by the error prediction control unit 35 in the microprocessor 26. The error prediction control unit 35 stores and monitors the unloading energy E1 data output by the unload control unit 33, and responds to the analysis request from the host computer 40.

The summary of these operations is described as an example in the flowchart in FIG. 7. To be more specific, in the magnetic disk device 10 of the present embodiment, cutoff of power supply is monitored (Step 201), when power supply cutoff is detected, the emergency unload is initiated by the emergency unload operation circuit 21b in the driver circuit 21 (Step 208).

When power failure is not detected in Step 201 mentioned above, the operation command for regular unloading is monitored (Step 202), and the regular unload is initiated when it is detected(Step 203).

In this regular unloading, the unloading is operated by the closed loop control described in FIG. 1 using the power supply of the magnetic disk device 10 (Step 204). Also, the unloading energy E1 is calculated by the unload control unit 33 simultaneously with the unload operation (Step 205), and warning of the future unload error is generated if the unloading energy E1 exceeds E0 (Step 206,207).

After this regular unloading, as the need arises, regular unloading completion is confirmed by a unloading success checking process as explained later (Step 100).

In such a way, the present embodiment allows the measurement of the energy required for the unloading as the unloading energy E1 during the operation of the regular unloading, and the determination of whether emergency unload is securely possible or not in the future by comparing the unloading energy E1 and the energy E0 of the spindle motor back electromotive force 13b that is the power source during emergency unload.

From these processes, boot errors of the magnetic disk device 10 caused by unloading failure can be predicted. By processing the report, corresponding to the request from the host computer 40, for the error prediction data based on the measurement of the unloading energy E1 as a part of the analysis data of the magnetic disk device 10, the users of the magnetic disk device 10 can accurately determine the need for a backup of the data stored on the magnetic disk device 10 before the breakdown of the magnetic disk device 10, so that they can prevent data loss.

Also, in the manufacturing method of the magnetic disk device 10, detection of the unloading energy E1 after the completion of the assembly as a check item allows the elimination of defective magnetic disk device 10 by the accurate determination that the unloading energy E1 is greater than a threshold due to poor assembly preventing the device from lasting for its nominal life.

Therefore, this process enables the elimination of potentially defective products.

Next, with reference to the flowchart of FIG. 8, an explanation for the checking process of unloading success in the Step 100 mentioned above is given below. The unload operation is initiated by the unload control unit 33 in the microprocessor 26 as it is described above. After the unload control unit 33 determines the completion of the unload by the feedback control of the voice coil motor back electromotive force 16b, verification of the unload success occurs as explained below.

The unload control unit 33 controls the read/write circuit 23 through the control circuit 25 and makes an attempt to read the servo signal from the head unit 14. If the servo mark 12c that is the mark causing the servo signal is found, the head unit 14 is assumed to be over the magnetic disk 12, and the unload is determined to have failed. If the servo signal is not found, it is determined that the unload succeeded.

The unload control unit 33 sends the unload success verification signal to the power save control unit 32. When the unload success verification signal indicates "success", the power save control unit 32 commands the spindle motor control unit 34 to decelerate the spindle motor 13 to decrease the power consumption. When the unloading success verification signal indicates "failure", the power save control unit 32 does not issue a command to stop the spindle motor 13 to the spindle motor control unit 34, even if the magnetic disk device 10 is no longer to be used and would thus usually stop the spindle motor. The flowchart in FIG. 8 summarizes this unload completion process. Specifically, after the termination of the unload operation 200 explained above, a servo mark search process is started (Step 101). A minute electric current circulates in the voice coil motor 16 as the actuator control current 16a to shift the head unit 14 to the center of the magnetic disk 12 (Step 102). The value of this current is set to be such that it is just insufficient to move the head unit 14 (the voice coil motor 16) onto the ramp 17 (i.e. a current that is insufficient to overcome the friction of the slope 17a). By this setting, when the unload succeeds, the head unit 14 does not move onto the magnetic disk 12 from the ramp 17.

When the head unit 14 is on the magnetic disk 12 (the unload is failed) during the application of this minute electric current, the head unit 14 moves toward the center of the magnetic disk 12. In this case, the head unit 14 moves to the data zone of the magnetic disk 12, and not only is the servo mark 12c detected but also other data such as its cylinder number is read out and examined.

The detection of such a servo mark 12c is confirmed (Step 103), and the regular unloading is determined to have failed when the servo mark 12c is detected (Step 104), and the deceleration of the spindle motor 13 is overridden (Step 105).

When the servo mark 12c is not detected, the regular unloading is determined success (Step 106), and the spindle motor 13 is decelerated (Step 107).

Also, based on the detection of the servo mark 12c on the magnetic disk 12 by the head unit 14 after the completion of the unloading, whether the head unit 14 is on the magnetic disk 12 or not is determined. Based on the result of this determination, success/failure of the unloading is decided, therefore the unloading success detection accuracy is improved.

In such a manner, when the unload has failed, contact friction and adhesion of the head unit 14 and the magnetic disk 12 can be prevented by avoiding the stopping of the spindle motor 13. As a result, reliability of the operation of the magnetic disk device 10 is improved.

In addition, needless to say that the application of the present invention is not limited to the device described in the preferred embodiment above, and flexible and various changes can be made within the extent that does not depart from its original purpose.

According to the present invention, it is possible to securely prevent the failure of unloading in a storage device that operates the loading and unloading of the head to the storage media. Also, it is possible to eliminate the potentially defective products during the manufacturing method of the storage device that operates the loading and unloading of the head to the storage media.

What is claimed is:

1. A storage device, which comprises:
    a storage media;
    a spindle motor, which spins the storage media;
    a head unit, which records the data to and reads the data from the storage media;
    an actuator, which carries out the positioning operation to the head unit over the storage media;
    a loading and unloading system, which controls the actuator, and carries out the unload operation that withdraws the head unit from the storage media and the loading operation that shifts the head unit over the storage media; and
    energy measurement means for determining the amount of unloading energy required for the unload operation.

2. The storage device according to claim 1, wherein:
    the actuator is a voice coil motor, and the measurement means calculates the unloading energy by using a control current that is provided to the voice coil motor during the unload operation and a back electromotive voltage generated by the voice coil motor, regarding the back electromotive voltage as proportional to the speed of the head unit, calculating the position of the head unit by integrating the speed, and calculating the unloading energy value from the control current value required for a position shift.

3. The storage device according to claim 1, wherein the device further comprises:
    an emergency unload system, which operates the unloading by inputting the spindle motor back electromotive force generated by the inertia of the spindle motor and the storage media to the actuator in the event of power supply cutoff; and a warning system, which outputs a warning that the unload operation of the emergency unload system cannot be carried out, determined by whether the unloading energy exceeds a back electromotive force.

4. The storage device according to claim 1, wherein the measurement means comprises a conversion output means that outputs the measured unloading energy converted into the number of load/unload operations based on the relationship between the number of unload operation and the unloading energy value.

5. A storage device, which comprises:
a storage media;
a spindle motor, which spins the storage media;
a head unit, which records data to and reads data from the storage media;
an actuator, which reads out positioning control data stored in the storage media, and carries out a positioning operation on the head unit over the storage media;
a loading and unloading system, which controls the actuator, and carries out an unload operation that withdraws the head unit from the storage media and a loading operation that shifts the head unit over the storage media; and
unloading verification means, which determines whether the unload operation succeeded or not based on the read status of the positioning control data read from the storage media by the head unit.

6. The storage device according to claim 5, wherein unloading the verification means has a function to continue spinning of the storage media when the unload operation failed.

7. A control method of the storage device, in which the storage device comprises:
a storage media;
a spindle motor, which spins the storage media;
a head unit, which records data to and reads data from the storage media;
an actuator, which carries out a positioning operation on the head unit over the storage media; and
a loading and unloading system, which controls the actuator, and carries out an unload operation that withdraws the head unit from the storage media and a loading operation that shifts the head unit over the storage media,
and the control method of the storage device comprises:
a first process where unloading energy required for the unload operation is measured during the unload operation; and
a second process where warning of the future failure of the unload operation is issued based on the difference in the unloading energy value and a criteria value.

8. The control method of the storage device according to claim 7, wherein
the first process involves that the unloading energy is calculated by using a control current that is provided to the voice coil motor during the unload operation and a back electromotive voltage generated in the voice coil motor, regarding the back electromotive voltage as proportional to the speed of the head unit, calculating the position of the head unit by integrating the speed, and calculating the unloading energy value from the control current value required for a position shift.

9. The control method of the storage device according to claim 7, wherein
the storage device further comprises an emergency unload system, which operates the unloading by inputting the spindle motor back electromotive force generated by the inertia of the spindle motor and the storage media to the actuator in the event of power supply cutoff;
the criteria value is the spindle motor back electromotive force; and
a second process where warning of future failure of the unload operation is issued based on the difference in the unloading energy value and the criteria value.

10. A control method of the storage device, which comprises:
a trial process to operate the unloading that carries out withdrawal of a head unit, which records and reads data on a storage media that spins, from the storage media;
a trial process to read a specific data stored on the storage media after an unload operation; and
a process to determine whether the unloading succeeded or not based on the read of the specific data.

11. The control method of the storage device according to claim 10, wherein the specific data is positioning control data stored in the storage media for the positioning control of the head unit on the storage media.

12. The control method of the storage device according to claim 10, wherein the storage media continues to spin when the unload operation fails.

13. A manufacturing method of the storage device, wherein:
a storage device, which comprises a loading and unloading system, which carries out an unload operation that withdraws a head unit, which records data to a storage media and reads from the storage media and the loading operation that shifts the head unit over the storage media; and
the manufacturing method measures the unloading energy required for the unload operation and determines the quality of the storage device based on the difference in the unloading energy value from a criteria value after completion of assembly of the storage device.

14. The manufacturing method of the storage device according to claim 13, wherein:
the storage device further comprises a spindle motor, which spins the storage media, and a voice coil motor, which carries out a positioning operation of the head unit over the storage media; and
the storage device, which calculates the unloading energy by using control current that is provided to a voice coil motor during the unload operation and back electromotive voltage generated in the voice coil motor, regarding the back electromotive voltage as proportional to the speed of the head unit, calculating the position of the head unit by integrating the speed, and calculating the unloading energy value from the control current value required for a position shift.

15. The manufacturing method of the storage device, according to claim 13, wherein:
the storage device further comprises an emergency unload system, which operates unloading by inputting the spindle motor back electromotive force generated by the inertia of the spindle motor and an storage media to the actuator in the event of power supply failure; and
the criteria value is the spindle motor back electromotive force.

* * * * *

UNITED STATES PATENT AND TRADEMARK OFFICE
CERTIFICATE OF CORRECTION

PATENT NO. : 7,212,371 B2 Page 1 of 1
APPLICATION NO. : 11/052185
DATED : May 1, 2007
INVENTOR(S) : Abe et al.

It is certified that error appears in the above-identified patent and that said Letters Patent is hereby corrected as shown below:

<u>In the Claims</u>:

Col. 14, line 12, delete "operate the" and insert --operate--.

Signed and Sealed this

Second Day of October, 2007

JON W. DUDAS
*Director of the United States Patent and Trademark Office*